US006984176B2

(12) United States Patent
Bishop

(10) Patent No.: US 6,984,176 B2
(45) Date of Patent: Jan. 10, 2006

(54) SYSTEM, METHODOLOGY, AND COMPUTER PROGRAM FOR GATHERING HOCKEY AND HOCKEY-TYPE GAME DATA

(75) Inventor: Aaron J. Bishop, Vancouver (CA)

(73) Assignee: Pointstreak.com Inc., Vancouver ( * ) Notice: Subject to any disclaimer, the term of this patent is extended or adjusted under 35 U.S.C. 154(b) by 2 days.

(21) Appl. No.: 09/946,891

(22) Filed: Sep. 5, 2001

(65) Prior Publication Data

US 2003/0045357 A1    Mar. 6, 2003

(51) Int. Cl.
*G06F 17/00*    (2006.01)
*G06F 19/00*    (2006.01)

(52) U.S. Cl. .............................. 463/42; 463/40; 700/92
(58) Field of Classification Search ................ 700/91, 700/92, 93; 463/40, 41, 42, 6; 340/323 R
See application file for complete search history.

(56) References Cited

U.S. PATENT DOCUMENTS

| | | | | |
|---|---|---|---|---|
| 5,198,976 A | * | 3/1993 | Form et al. .................... | 700/91 |
| 5,412,188 A | * | 5/1995 | Metz ............................ | 235/375 |
| 5,745,029 A | * | 4/1998 | Garcia ..................... | 340/323 R |
| 5,898,587 A | * | 4/1999 | Bell et al. ...................... | 700/92 |
| 5,946,489 A | * | 8/1999 | Yellin et al. ................. | 717/147 |
| 6,041,266 A | * | 3/2000 | Nickerson ..................... | 700/92 |
| 6,102,797 A | * | 8/2000 | Kail ............................. | 463/16 |
| 6,122,559 A | * | 9/2000 | Bohn ........................... | 700/91 |
| 6,148,242 A | * | 11/2000 | Descalzi et al. ............... | 700/90 |
| 6,328,569 B1 | * | 12/2001 | Jenkins et al. .............. | 434/169 |
| 6,820,094 B1 | * | 11/2004 | Ferguson et al. ........... | 707/200 |
| 2002/0091723 A1 | * | 7/2002 | Traner et al. ................ | 707/205 |

OTHER PUBLICATIONS 2001-2003 Official Rules of Ice Hockey, USA Hockey Inc., Triumph Books, Chicago: 2001,pp. 1-176.*
"Pompey-Fans.com" [online] Jul. 19, 2004. [Retrieved from the Internet on Dec. 13, 2004], URL:<http://protsmouth.rivals.net/default.asp?sid=922&p=2&stid=7961732>.*

* cited by examiner

*Primary Examiner*—Julie Brocketti
(74) *Attorney, Agent, or Firm*—Hodgson Russ LLP

(57) ABSTRACT

An system, methodology and computer program product for gathering game data pertaining to players, teams, and leagues, so that the players, teams, league, and league administrators have access to the game data. A touch screen computer terminal is provided at the sports venue and it is in communication with a computer network. A server computer is in communication with the touch screen computer terminal over the computer network, and the server computer receives the game data over the computer network from the touch screen computer terminal, and proceeds to and store and organize the game data in a database. The game data is then made available over the computer network to league administrators, so that the league administrators can make quick and accurate decisions based on game data. The game data is also made available to the players over the computer network.

13 Claims, 37 Drawing Sheets

Team Roster
Home Team – Green
Change Jersey Number

Player:    Tom
Old Jersey: 7

Enter New Jersey #:

44

| 1 | 2 | 3 |
| 4 | 5 | 6 |
| 7 | 8 | 9 |
|   | 0 | : |

OK | Clear

FIG. 20

Goal Scored

Team:    Home – Green

16

Enter Scorers #:

| 1 | 2 | 3 |
| 4 | 5 | 6 |
| 7 | 8 | 9 |
|   | 0 | : |

Back        OK | Clear

FIG. 21

Goal Scored

Team: Home – Green
Scorer: 16 – John

Enter 1st Assist #:
(Leave Blank for None)

[ 23 ]

| 1 | 2 | 3 |
|---|---|---|
| 4 | 5 | 6 |
| 7 | 8 | 9 |
| 0 | : |   |

[Back]  [OK] [Clear]

FIG. 22

Goal Scored

Team: Home – Green
Scorer: 16 – John
Scorer: 23 – Jim

Enter 2nd Assist #:
(Leave Blank for None)

[    ]

| 1 | 2 | 3 |
|---|---|---|
| 4 | 5 | 6 |
| 7 | 8 | 9 |
| 0 | : |   |

[Back]  [OK] [Clear]

FIG. 23

Goal Scored

Team: Home – Green
Scorer: 16 – John
Assist 1: 23 – Jim
Assist 2: None

Choose Period:  [1]  [2]  [3]

[Back]

FIG. 24

Goal Scored

Team: Home – Green
Scorer: 16 – John
Assist 1: 23 – Jim
Assist 2: None
Period: 2

Enter Time:

5:32

| 1 | 2 | 3 |
|---|---|---|
| 4 | 5 | 6 |
| 7 | 8 | 9 |
| 0 | : |   |

[Back]  [OK] [Clear]

FIG. 25

```
             Goal Scored
Team:      Home - Green
Period:    2
Scorer:    16 - John
Assist 1:  23 - Jim
Assist 2:  None
Time:      5:32

[Back]              [Done]
```

FIG. 26

```
              Penalty
Team:      Away - Falcons

┌──────┐
                          │  11  │
                          ├──┬──┬──┤
                          │1 │2 │3 │
Enter Jersey #:           │4 │5 │6 │
                          │7 │8 │9 │
                          │0 │: │
                          ├──┴──┤
   [Back]                 │OK│Clear│
```

FIG. 27

Penalty

Team: Away – Falcons
Player: 11 – Buddy

Infraction:
| Tripping |
| Holding |
| Slashing |
| Fighting |

Back

FIG. 28

Penalty

Team: Away – Falcons
Player: 11 – Buddy
Infraction: Tripping

Type:
| Minor | 3:00 |
| Double Minor | 6:00 |
| Major | 7:00 |
| Misconduct | 10:00 |

Back

FIG. 29

Penalty

Team:       Away – Falcons
Player:     11 – Buddy
Infraction: Tripping
Type:       Minor   3:00

Choose Period:   [1]  [2]  [3]

[Back]

FIG. 30

Penalty

Team:       Away – Falcons
Player:     11 – Buddy
Infraction: Tripping
Type:       Minor   3:00
Period:     1

Enter Time:

[Back]

12:33

| 1 | 2 | 3 |
| 4 | 5 | 6 |
| 7 | 8 | 9 |
|   | 0 | : |

[OK] [Clear]

FIG. 31

Penalty

Team: Away – Falcons
Player: 11 – Buddy
Infraction: Tripping
Type: Minor   3:00
Period: 1
Time: 12:33

[Back]   [Done]

FIG. 32

Other Functions

[Edit Goal]   [Edit Penalty]

[Delete Goal]   [Delete Penalty]

[Modify Game Info]

[Exit]

FIG. 33

| Back | End Game | OK |
| --- | --- | --- |
| | Game Review | |

| Green | | | | | | Falcons | | | | | |
| --- | --- | --- | --- | --- | --- | --- | --- | --- | --- | --- | --- |
| G | Per | Time | S | A | A2 | G | Per | Time | S | A | A2 |
| 1 | 1 | 7:14 | 4 | 15 | 16 | 1 | 1 | 5:10 | 1 | 22 | 4 |
| 2 | 2 | 5:32 | 16 | 23 | – | 2 | 1 | 4:50 | 23 | 33 | 7 |
| 3 | 2 | 2:53 | 28 | 6 | 2 | | | | | | |
| 4 | 3 | 8:11 | 4 | 2 | 14 | | | | | | |
| 5 | 3 | 4:12 | 11 | 28 | 16 | | | | | | |

| # | Penalty | Min | Per | Time | # | Penalty | Min | Per | Time |
| --- | --- | --- | --- | --- | --- | --- | --- | --- | --- |
| 3 | Tripping | 2 | 1 | 7:14 | 25 | Interference | 3 | 1 | 4:10 |
| 12 | Fighting | 5 | 2 | 12:33 | 11 | Tripping | 2 | 2 | 5:32 |
| 8 | Checking | 2 | 2 | 4:53 | 4 | Fighting | 5 | 2 | 12:33 |
| 3 | High Stick | 2 | 3 | 3:11 | | | | | |

*Pointstreak.com*
electronic gamesheet system path >> HOME >> LEAGUE > division

| PLAYERS | ADMIN | ABOUT US |

[ Sign up ]

*Sample Division*
*Sample League*

>> View division scoring leaders
>> View division goaltending leaders

TEAM STANDINGS

| Team Name | GP | W | L | T | PTS | GF | GA | PIM |
|---|---|---|---|---|---|---|---|---|
| Team #1 ("T-1") | 28 | 11 | 8 | 9 | 31 | 40 | 34 | 128 |
| Team #2 ("T-2") | 31 | 14 | 10 | 7 | 35 | 49 | 45 | 133 |
| Team #3 ("T-3") | 56 | 7 | 36 | 13 | 27 | 43 | 73 | 90 |
| Team #4 ("T-4") | 62 | 32 | 8 | 22 | 86 | 99 | 74 | 244 |
| Team #5 ("T-5") | 64 | 31 | 16 | 17 | 79 | 110 | 86 | 201 |
| Team #6 ("T-6") | 53 | 12 | 29 | 12 | 36 | 61 | 90 | 196 |

> Upcoming Games

| Away | | Home | | Date | Time | Rink |
|---|---|---|---|---|---|---|

> Recent Games

| Away | | Home | | Date | | Box Score |
|---|---|---|---|---|---|---|
| T-1 | 0 | T-5 | 1 | Wed, Dec 12, 2001 | | game box score |
| T-6 | 0 | T-5 | 1 | Wed, Aug 29, 2001 | | game box score |
| T-3 | 0 | T-4 | 0 | Mon, Aug 27, 2001 | | game box score |
| T-3 | 0 | T-4 | 0 | Mon, Aug 27, 2001 | | game box score |

FIG. 47

> PENALTIES

Period 1
(no penalties)

Period 2
(no penalties)

Period 3
(no penalties)

> ROSTERS

| 14 | Player #1 | 11 | Player #23 |
|---|---|---|---|
| 15 | Player #2 | 15 | Player #24 |
| 17 | Player #3 | 18 | Player #25 |
| 19 | Player #4 | 20 | Player #26 |
| 2 | Player #5 | 22 | Player #27 |
| 20 | Player #6 | 23 | Player #28 |
| 21 | Player #7 | 24 | Player #29 |
| 22 | Player #8 | 25 | Player #30 |
| 23 | Player #9 | 26 | Player #31 |
| 24 | Player #10 | 27 | Player #32 |
| 25 | Player #11 | 3 | Player #33 |
| 26 | Player #12 | 38 | Player #34 |
| 3 | Player #13 | 5 | Player #35 |
| 33 | Player #14 | 6 | Player #36 |
| 34 | Player #15 | 66 | Player #37 |
| 37 | Player #16 | 68 | Player #38 |
| 44 | Player #17 | 8 | Player #39 |

FIG. 49

| | |
|---|---|
| 55 Player #18 | 82 Player #40 |
| 7 Player #19 | 9 Player #41 |
| 72 Player #20 | 95 Player #42 |
| 8 Player #21 | |
| 9 Player #22 | |

Home Goalie
  Goalie #1

Away Goalie
  Goalie #2

Referee
  Referee #1

Score Keeper

> GAME NOTES

FIG. 50

Pointstreak.com
*electronic gamesheet system* path >> HOME >> LEAGUE >> DIVISION > team page

| | PLAYERS | ADMIN | ABOUT US |

Sign up

Division: Sample Division League: Sample League

> Schedule
> Player Stats

> TEAM RECORD

| GP | W | L | T | PTS | GF | GA | GFA | GAA | PIM | HOME | AWAY |
|----|---|---|---|-----|----|----|----|-----|-----|------|------|
| 28 | 11 | 8 | 9 | 31 | 40 | 34 | 1.43 | 1.21 | 128 | 10-2-3 | 1-6-6 |

> Upcoming Games

| Away | Home | | Date | Time | Rink |
|------|------|---|------|------|------|

> Recent Games

| Away | | Home | | Date | Box Score |
|------|---|------|---|------|-----------|
| T-1 | 0 | T-5 | 1 | Wed, Dec 12, 2001 | game box score |
| T-1 | 3 | T-6 | 0 | Mon, Aug 13, 2001 | game box score |
| T-1 | 1 | T-3 | 1 | Mon, Aug 13, 2001 | game box score |
| T-5 | 0 | T-1 | 2 | Mon, Aug 13, 2001 | game box score |
| T-6 | | T-1 | 2 | Thu, Aug 09, 2001 | game box score |

> Captains Message

FIG. 51

Pointstreak.com
electronic gamesheet system path >> HOME >> LEAGUE >> DIVISION >> TEAM > team page Sign up Division: Sample Division League: Sample League

TEAM #4

Player Stats

| # | NAME (position) | GP | G | A | PTS | PIM |
|---|---|---|---|---|---|---|
| 2 | Player #43 C | 61 | 16 | 29 | 45 | 6 |
| 8 | Player #44 D | 60 | 15 | 26 | 41 | 36 |
| 7 | Player #45 LW | 60 | 24 | 16 | 40 | 43 |
| 5 | Player #46 D | 60 | 23 | 11 | 34 | 24 |
| 12 | Player #47 LW | 60 | 6 | 21 | 27 | 33 |
| 25 | Player #59 RW | 60 | 2 | 5 | 7 | 3 |
| 23 | Player #60 D | 60 | 1 | 6 | 7 | 0 |
| 26 | Player #61 C | 60 | 1 | 6 | 7 | 4 |
| 27 | Player #62 RW | 60 | 1 | 6 | 7 | 0 |
| 32 | Player #63 D | 60 | 0 | 7 | 7 | 0 |
| 94 | Player #64 LW | 60 | 1 | 5 | 6 | 6 |
| 44 | Player #65 D | 60 | 4 | 1 | 5 | 9 |
| 39 | Player #66 C | 36 | 2 | 3 | 5 | 10 |
| 34 | Player #67 C | 60 | 1 | 4 | 5 | 6 |
| 19 | Player #68 D | 60 | 2 | 2 | 4 | 0 |
| 22 | Player #69 RW | 59 | 0 | 3 | 3 | 0 |
| 17 | Player #70 LW | 60 | 0 | 2 | 2 | 2 |
| 36 | Player #71 C | 60 | 0 | 2 | 2 | 3 |

FIG. 52a

|    |            |    |    |   |   |   |    |
|----|------------|----|----|---|---|---|----|
| 89 | Player #72 | C  | 60 | 0 | 2 | 2 | 2  |
| 14 | Player #73 | C  | 49 | 0 | 2 | 2 | 16 |
| 18 | Player #74 | LW | 60 | 0 | 1 | 1 | 2  |
| 69 | Player #75 | C  | 46 | 0 | 1 | 1 | 0  |
| 55 | Player #76 | D  | 41 | 0 | 0 | 0 | 12 |
| 21 | Player #77 | D  | 2  | 0 | 0 | 0 | 25 |

FIG. 52b

| | | | | | | | | |
|---|---|---|---|---|---|---|---|---|
| 23 | 20 | Player | #6 | T-5 | 56 | 2 | 12 | 14 | 2 |
| 24 | 13 | Player | #57 | T-6 | 47 | 6 | 7 | 13 | 17 |
| 25 | 3 | Player | #58 | T-6 | 23 | 3 | 10 | 13 | 25 |

FIG. 53

Goalie Stats

| # | NAME | # | GP | W | L | T | GA | GAA | SO |
|---|------|---|----|----|---|---|----|------|----|
| 35 | Goalie | #3 | 40 | 20 | 5 | 15 | 50 | 1.25 | 19 |
| 30 | Goalie | #4 | 22 | 12 | 3 | 7  | 24 | 1.09 | 11 |

FIG. 54

Pointstreak.com
electronic gamesheet system
path >> HOME >> LEAGUE > DIVISION > leaders

| PLAYERS | ADMIN | ABOUT US |

Sign up

Sample Division
Sample League

>> View division goaltending leaders

> Scoring Leaders

@ view all click on the category to re-sort stats

| RK | # | NAME | TEAM | GP | G | A | PTS | PIM |
|----|---|------|------|----|----|----|-----|-----|
| 1 | 2 | Player #43 | T-4 | 61 | 16 | 29 | 45 | 6 |
| 2 | 3 | Player #13 | T-5 | 56 | 26 | 16 | 42 | 18 |
| 3 | 8 | Player #44 | T-4 | 60 | 15 | 26 | 41 | 36 |
| 4 | 7 | Player #45 | T-4 | 60 | 24 | 16 | 40 | 43 |
| 5 | 2 | Player #5 | T-5 | 57 | 10 | 29 | 39 | 11 |
| 6 | 5 | Player #46 | T-4 | 60 | 23 | 11 | 34 | 24 |
| 7 | 12 | Player #47 | T-4 | 60 | 6 | 21 | 27 | 33 |
| 8 | 81 | Player #21 | T-5 | 51 | 13 | 12 | 25 | 20 |
| 9 | 4 | Player #48 | T-6 | 46 | 12 | 10 | 22 | 21 |
| 10 | 19 | Player #4 | T-5 | 58 | 19 | 1 | 20 | 3 |
| 11 | 7 | Player #19 | T-5 | 57 | 9 | 11 | 20 | 46 |
| 12 | 7 | Player #49 | T-6 | 47 | 12 | 7 | 19 | 15 |
| 13 | 4 | Player #50 | T-3 | 55 | 11 | 8 | 19 | 15 |
| 14 | 5 | Player #51 | T-3 | 53 | 11 | 7 | 18 | 11 |
| 15 | 14 | Player #52 | T-2 | 29 | 4 | 14 | 18 | 31 |

FIG. 55a

| | | Player | | | | | | | |
|---|---|---|---|---|---|---|---|---|---|
| 16 | 6 | Player #36 | T-1 | 27 | 8 | 9 | 17 | 23 |
| 17 | 2 | Player #53 | T-6 | 47 | 6 | 11 | 17 | 14 |
| 18 | 13 | Player #54 | T-2 | 30 | 7 | 9 | 16 | 12 |
| 19 | 9 | Player #55 | T-3 | 53 | 10 | 4 | 14 | 24 |
| 20 | 7 | Player #56 | T-2 | 30 | 10 | 4 | 14 | 28 |
| 21 | 5 | Player #35 | T-1 | 28 | 8 | 6 | 14 | 15 |

FIG. 55b

Pointstreak.com
electronic gamesheet system path >> HOME >> LEAGUE >> DIVISION > leaders

| PLAYERS | ADMIN | ABOUT US |

*Sample Division*
*Sample League*

>> View division scoring leaders

> Goaltending Leaders

@ view all click on the category to re-sort stats

| RK | # | NAME | TEAM | GP | W | L | T | GA | GAA | SO |
|----|----|---------|------|----|----|----|----|----|------|----|
| 1  | 35 | Goalie #3  | T-4 | 40 | 20 | 5  | 15 | 50 | 1.25 | 19 |
| 2  | 39 | Goalie #1  | T-5 | 30 | 14 | 8  | 8  | 41 | 1.37 | 11 |
| 3  | 30 | Goalie #4  | T-4 | 22 | 12 | 3  | 7  | 24 | 1.09 | 11 |
| 4  | 35 | Goalie #5  | T-5 | 28 | 11 | 8  | 9  | 43 | 1.54 | 7  |
| 5  | 33 | Goalie #6  | T-2 | 19 | 11 | 6  | 2  | 31 | 1.63 | 7  |
| 6  | 31 | Goalie #7  | T-6 | 37 | 9  | 21 | 7  | 62 | 1.68 | 7  |
| 7  | 39 | Goalie #1  | T-5 | 6  | 6  | 0  | 0  | 2  | 0.33 | 5  |
| 8  | 30 | Goalie #8  | T-1 | 18 | 6  | 6  | 6  | 24 | 1.33 | 7  |
| 9  | 43 | Goalie #9  | T-3 | 34 | 4  | 21 | 9  | 51 | 1.50 | 6  |
| 10 | 39 | Goalie #10 | T-3 | 22 | 3  | 15 | 4  | 22 | 1.00 | 4  |
| 11 | 1  | Goalie #11 | T-2 | 12 | 3  | 4  | 5  | 14 | 1.17 | 4  |
| 12 | 1  | Goalie #2  | T-1 | 7  | 3  | 1  | 3  | 10 | 1.43 | 2  |
| 13 | 30 | Goalie #12 | T-6 | 16 | 3  | 8  | 5  | 30 | 1.88 | 2  |

FIG. 56

SYSTEM, METHODOLOGY, AND COMPUTER PROGRAM FOR GATHERING HOCKEY AND HOCKEY-TYPE GAME DATA

BACKGROUND

In today's society, people are turning more and more to sports for enjoyment and to relieve everyday stress. Sports teams and leagues at the amateur level are presently a rapid growth segment. In fact, a great deal of time is expended by the administrators of these teams and leagues to keep all the game data and player statistical data accurate, current, and complete.

Game data comprising, among other things, statistics is kept for individual players as well for teams and leagues. The way in which these records are kept is oftentimes by pen and paper or worse yet, memory. These methods have their limitations. For example, manually written records can become lost, damaged when in adverse environments, or altered. Further, manually written records on player statistics become unwieldy as the accumulate over time, and ultimately end up being destroyed or recycled. Also, editing paper records causes vast amounts of time to be wasted in simply locating the statistics to be edited.

The problems with the present system is therefore multifaceted. Players and teams have gaps in their personal and team performances, and players oftentimes are forced to keeping their own statistics if they want to monitor their own growth or lack thereof.

Another significant problem associated with present paper based statistical record keeping is that league administrators have old records and oftentimes incomplete, messy, and illegible records to use to make important decisions, such as what players to suspend, resolving disputes, player misconduct, and other related decisions.

Yet another problem with current record keeping techniques is that the statistics become inaccessible to the athletes, as they are kept in logs or manuals controlled by someone else, who is typically inconveniently located. Not having the statistics of how other players are performing can have dramatic effects on competitions. For example, in hockey, mismatches between competing athletes may occur resulting in injuries to one or both of the athletes.

Thus, there is a need for a better way to maintain statistical records (data) pertaining to athletes and sports teams and make this statistical data quickly available to league administrators so that he or she can make important decisions in a timely manner and therefore make the league run more efficiently and safely.

SUMMARY OF THE INVENTION

The present invention is directed to a new system and methodology and computer program product for an electronic gamesheet to be used for keeping and maintaining game data, that itself comprises statistical data. The present invention comprises an electronic game sheet that may be used in conjunction with hockey (ice), and other similar sports comprising field hockey, lacrosse, ball hockey, and roller hockey. The system comprises a touch screen computer terminal located at the sporting venue. One of these touch screen computer terminals is positioned at each hockey rink. The touch screen computer terminal (or client computer) is in electronic communication with a system server computer. Game data comprising statistical data, team data, and league data is entered into the touch screen computer terminal at the rink and stored therein as the game is played. An official or scorekeeper enters the game data as it is generated. After the game has ended, the resultant game data entered into the touch screen computer terminal is verified by the referee, and the game data is then uploaded to the server computer from the touch screen computer terminal by way of wireless transmission. The upload may also be by way of the internet (world wide web) if the touch screen computer terminal is linked to same at the hockey rink, which is not always the case. After upload to the server computer, the server computer is in communication with a database and the uploaded game data is stored and organized in the database in tables.

The league administrator, from his or her computer, then accesses the server computer database over the internet and makes important decisions comprising suspending players, resolving disputes, and editing rosters. Indeed, the administrator can prevent unregistered and suspended players from playing by entering this information into the database, so that the scorekeeper sees this information when retrieving that player from the system database in a manner fully described in the detailed description. Additionally, the actual players may view all the game data and their personal statistical data over the internet so that they know the team standings and their own statistics. The players cannot edit their own statistical data, as this important task is for an administrator.

Thus, the system maintains game data in a logical and convenient format, and it is therefore a useful tool for sports organizations. The system eliminates the need for paper records and paper gamesheets and thus eliminates the problems associated with this paper based gamesheets, for example, time delays, messy handwriting, missing/lost gamesheets. Further, the system is superior to the paper gamesheet methods, because when paper gamesheets are used, someone must go to all the separate rinks and collect the outstanding gamesheets. Also, since data is entered into an electronic system, the burden on league administrators is greatly decreased and the administrators can do other things for the sports organization.

Thus, the present invention avoids and overcomes the problems associated with paper gamesheets and handwritten statistical data records and prior methods of managing game data.

BRIEF DESCRIPTION OF THE FIGURES

FIGS. 7–20 show the screen shots displayed on the touch screen for the entry game data for the date, time, league, division, home team, referee, linesman 1, linesman 2 and begin game, team roster, forfeits, selected goalie, selected players, and changes in jersey number, respectively.

FIGS. 21–26 show the screen shots displayed on the touch screen for the entry of data for the jersey number of the goal scorer, first assist, second assist, period, time, and summary of goal.

FIGS. 27–32 show the screen shots displayed on the touch screen for the player penalty, infraction, type (major or minor), period, time, and summary of the penalty.

FIG. 33 shows the screen shot displayed on the touch screen for other functions that allow for editing input game data.

FIGS. 46–56 show the screen shots that a player would be able to view from his or her own computer showing the game data.

DETAILED DESCRIPTION OF THE DRAWINGS

Figure 1:
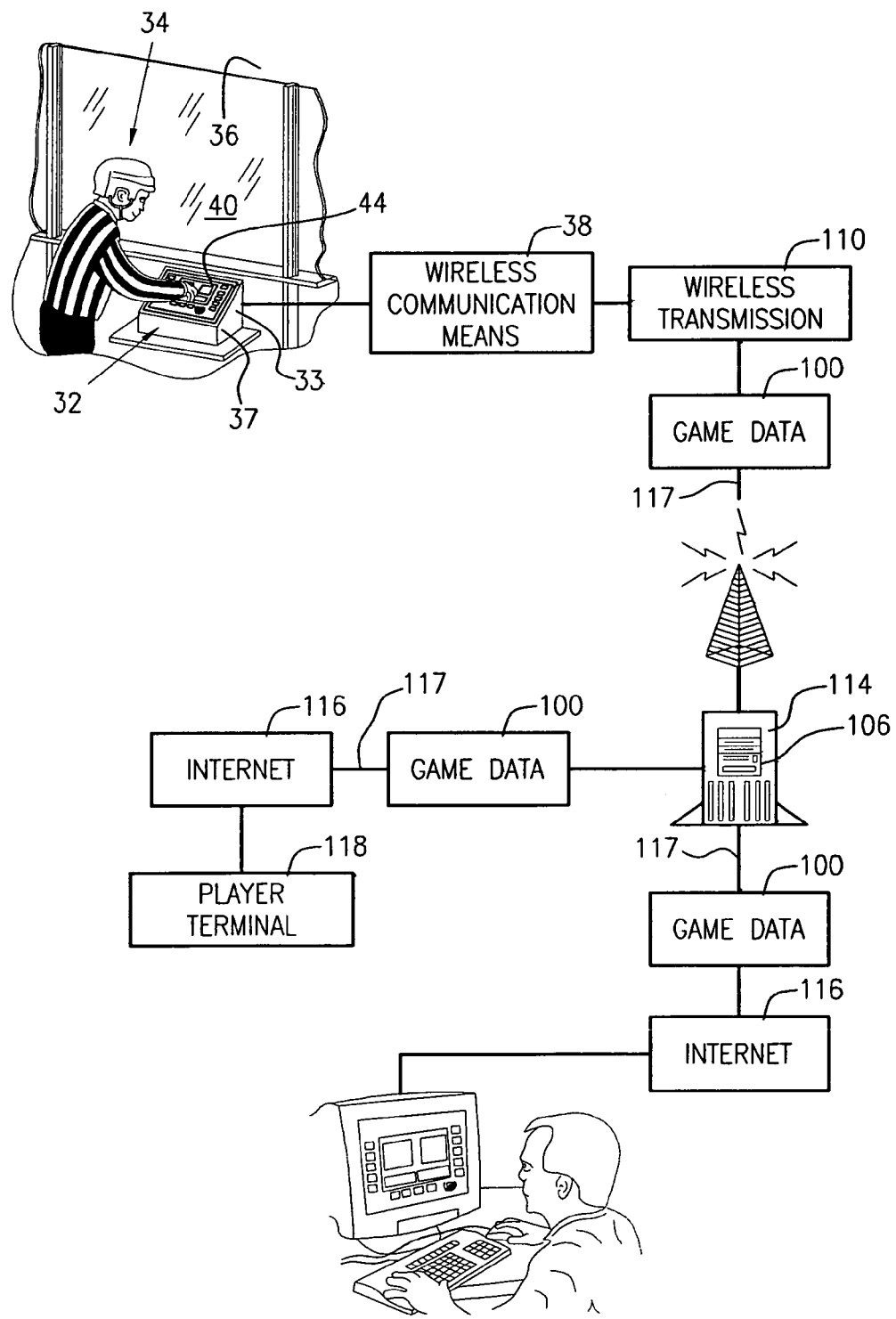
FIG. 1 shows a diagrammatic view of the overall the system layout.

As seen in FIG. 1, the present invention is for a system 30 and methodology comprising an electronic gamesheet 102 (FIG. 2) that keeps track of and maintains the game data 100 pertaining to hockey players, teams, and leagues, so that league administrators can quickly and efficiently make important decisions pertaining to the hockey game. Among other things, these important decisions comprise whether or not to suspend a player, altering the players on a team, altering the term of a suspension, resolving disputes between team and players and the league, reviewing the games after they are played, inputting the rosters for the teams, and leaving important messages for the teams. The present system 30 and methodology are beneficial to both recreational and amateur hockey leagues and organizations, as game data 100 is instantly available over the internet 116 (world wide web) or by wireless transmission 110.

It is noted at the outset that the present detailed description is written for an embodiment of the present invention wherein game data 100 for the sport of hockey is described and detailedly discussed. However, one skilled in the art will recognize that in alternative embodiments, the present system 30 and methodology may be embodied so that it can be used in conjunction with other sports comprising: field hockey, lacrosse, ball hockey, and roller hockey without deviating from the principles described herein.

Figure 3:
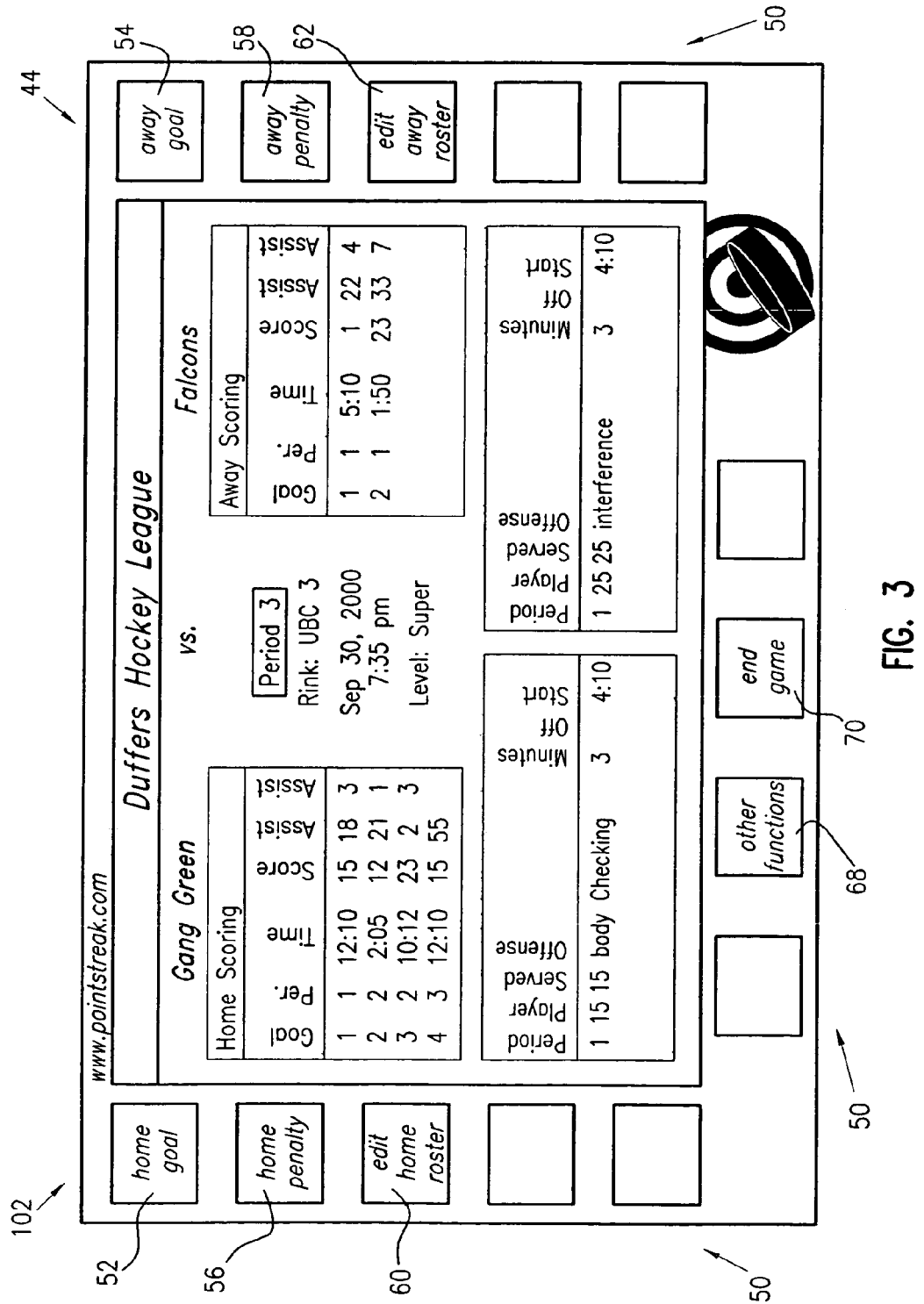
FIG. 3 shows a screen shot for the touch screen that the scorekeeper (and referee) view at the hockey rink.

Turning now to FIG. 1, shown therein is a diagrammatic view of the overall layout of the system 30. In this embodiment, the system 30 that comprises a touch screen computer terminal (client computer) 32 in wireless communication by way of the wireless communication means 38, with the server computer 114. Shown in FIG. 3 is the touch screen computer terminal that the scorekeeper (or referee or game official) 34 has access. Displayed on the touch screen computer terminal 32 is an electronic gamesheet 102 that has the functionality of a graphical user interface (GUI), as seen in FIG. 3. One of the scorekeeper's 34 jobs is to access the touch screen computer terminal 32 and enter game data 100 into the touch screen computer terminal 32 as the game is played. The touch screen computer terminal (or ice rink computer terminal) 32 may be securely installed within the penalty box 40 at the ice rink 36, one being installed at each ice rink 36 in the league. The game data 100 from the game is entered into the touch screen computer terminal 32 by way of a plurality of touch screen displays 44 displayed on the touch screen computer terminal 32. Examples of the touch screen displays 44 into which game data 100 is entered may be viewed in FIGS. 21–26. The game data 100 entered into the touch screen displays 44 is stored in the touch screen computer terminal's 32 memory, then verified by a referee 34 and uploaded to the server computer 114 by way of carrier wave transmission as seen in FIG. 1. This is a protection against a power failure or computer communications fail all the game data 100 will not be lost.

As seen in FIG. 1, the game data 100 is transmitted via carrier wave signals 110 or other form of electronic wireless transmission to the server computer (server) 114. If the rink 36 is wired for internet access, a wired link may be established between the touch screen computer terminal 32 and the server computer 114 over a computer network 117 such as the internet 116 or world wide web.

Figure 2:
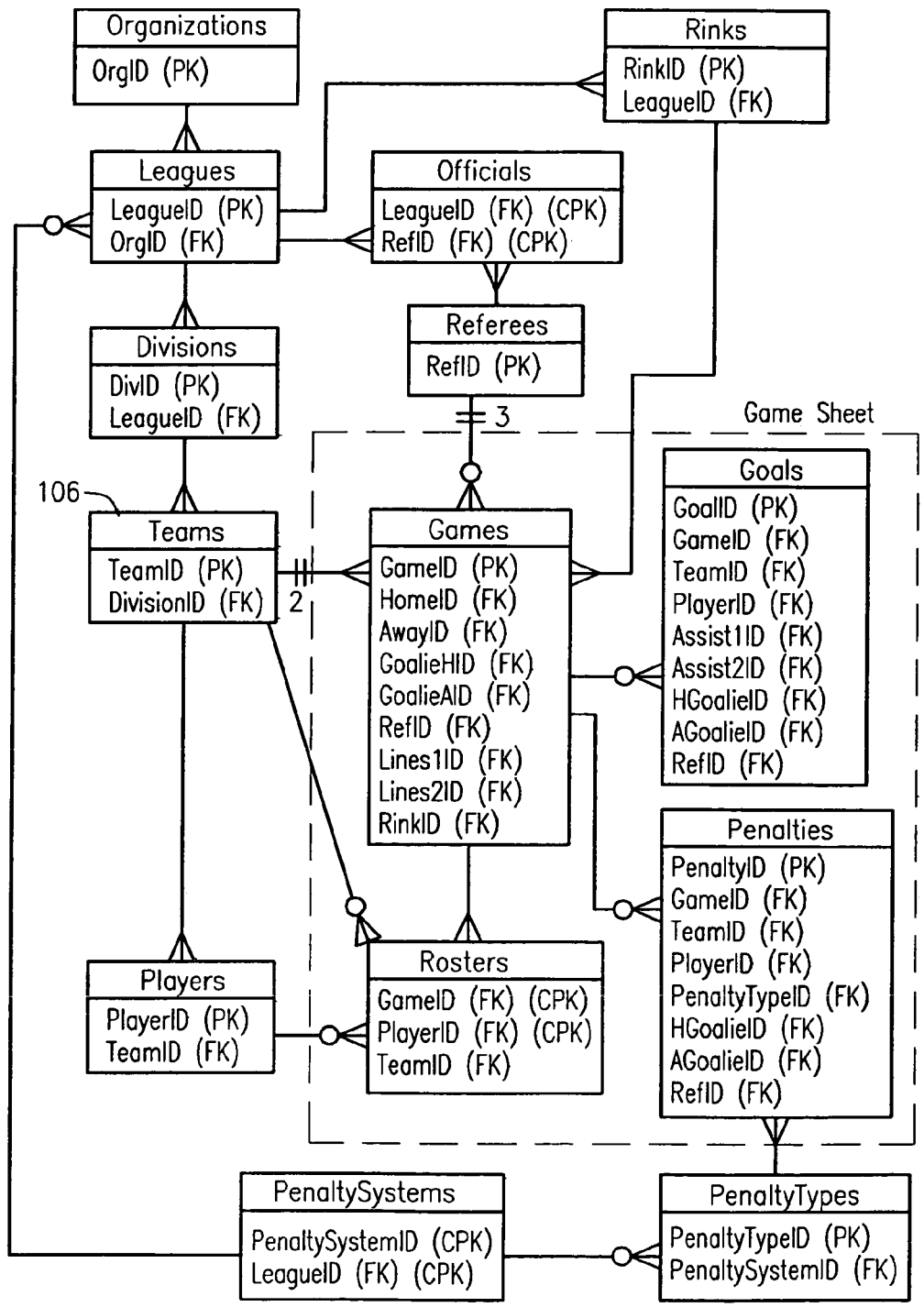
FIG. 2 shows the layout for the database for the system.

Once the game data 100 reaches the server computer 114, is then stored and organized in the database 106 as seen in FIG. 2. From there, the game data 100 may be transmitted over the internet (or world wide web) 116 to the league administrator 42. The league administrator 42 can then make rapid decisions pertaining to the game and transmit them back to the scorekeeper 34 in the reverse order of the process just described.

Further, once this game data 100 is transmitted, it updates the system 30 database 106 that is in communication with the server computer 114. The game data 100, which among other things comprises statistical data 101 for each player team and league, is then made available for viewing over the internet (world wide web) at the web site bearing the domain name "www.Pointstreak.com". The players, if they have access to a player terminal 118, can instantly access all the game data 100 comprising among other things statistical data 101 by accessing the "Pointstreak.com" web site. The statistical data 101 may be embodied to comprise a player's personal statistics, team statistics, league statistics, penalties, wins, losses, and schedules. However, the players do not have authority to edit game data 100.

Turning now to FIG. 2, shown therein is a schematic for the database 106 for the system 30 that is in communication with the server computer 114. The database 106, as seen in FIG. 2, stores and organizes all the game data 100 for a plurality of aspects of the hockey game, this game data 100 is described below. FIG. 3 shows the touch screen display 44 (electronic gamesheet 102) appearing on the touch screen computer terminal 32 located at the rink 36 that the scorekeeper 34 manually enters game data 100 pertaining to the game into. Seen in FIG. 3 is an example of a touch screen display 44 showing fictitious data entered therein (all the screen shots herein are intended to comprise fictitious game data for the purposes of illustration and example). The touch screen display 44 provides rapid access to a plurality of information pertaining to the hockey game being played.

Seen in FIG. 3 is the touch screen display 44 the scorekeeper 34 views on the touch screen computer terminal 32, and it shows the electronic gamesheet 102 which among other things displays the hockey league, the teams playing, home team scoring, away team scoring, the period, the date and time of the game. Around the periphery of the electronic game sheet 102 are a plurality of buttons 50 that the scorekeeper 34 can press for purposes to be described presently. These plurality of buttons 50 comprise home goal 52, away goal 54, home penalty 56, away penalty 58, edit home roster 60, and edit away roster 62. Upon depressing one of the plurality of buttons 50, the associated touch screen display 44 is called up and displayed for the scorekeeper 34 and the scorekeeper 34 can commence entering game data 100 therein.

Figure 4:
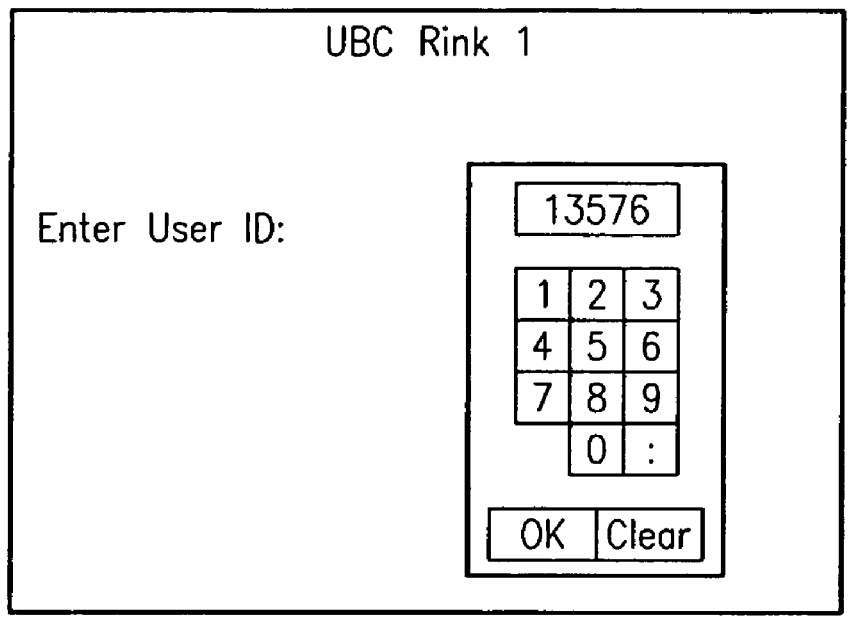
FIGS. 4–6 show screen shots displayed on the touch screen that as the scorekeeper enters passwords into to gain access to the touch screen computer terminal, and whether to start a new game or restore a saved game.
Figure 5:
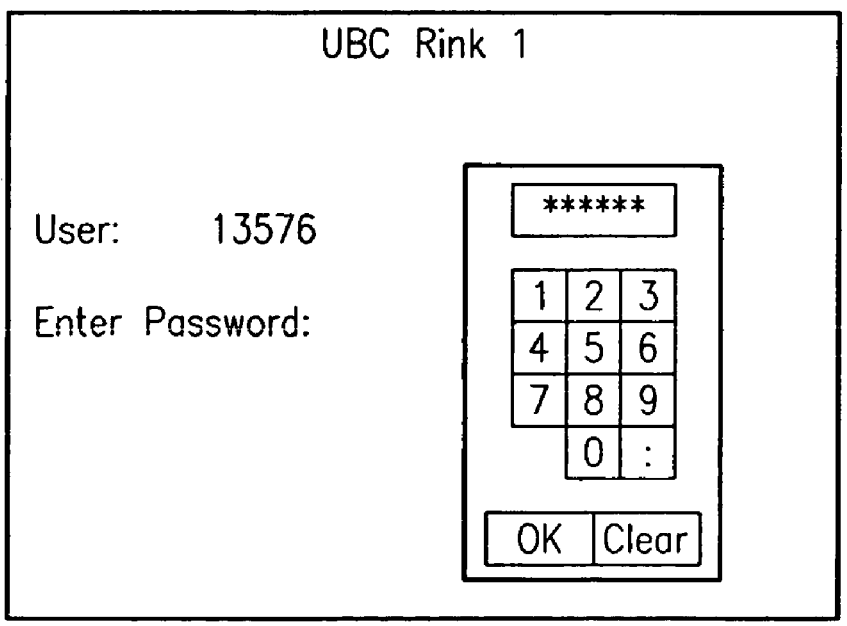
Figure 6:
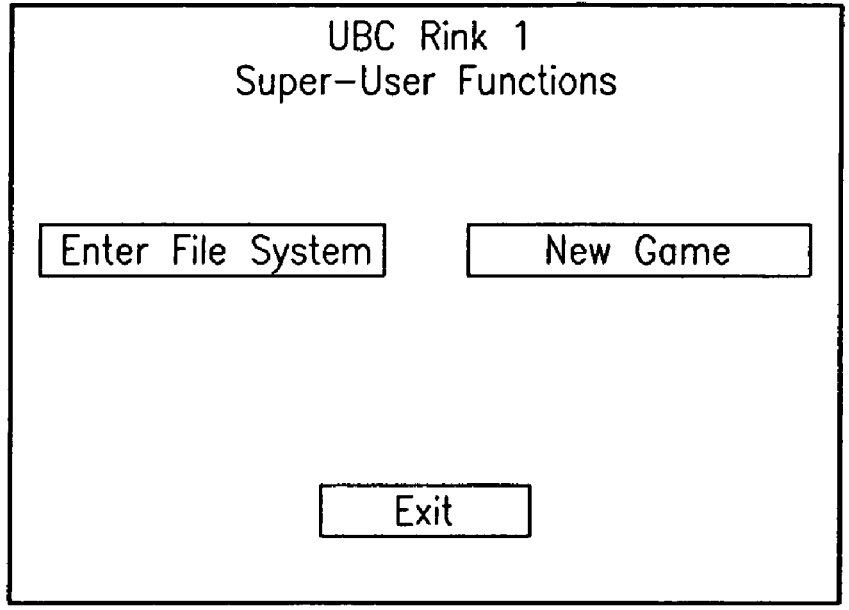
Figure 7:
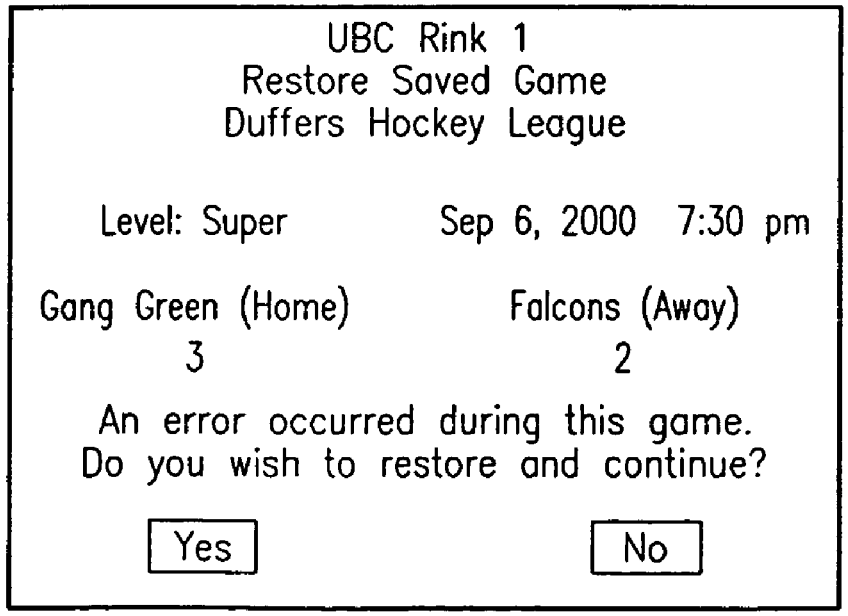
Figure 8:
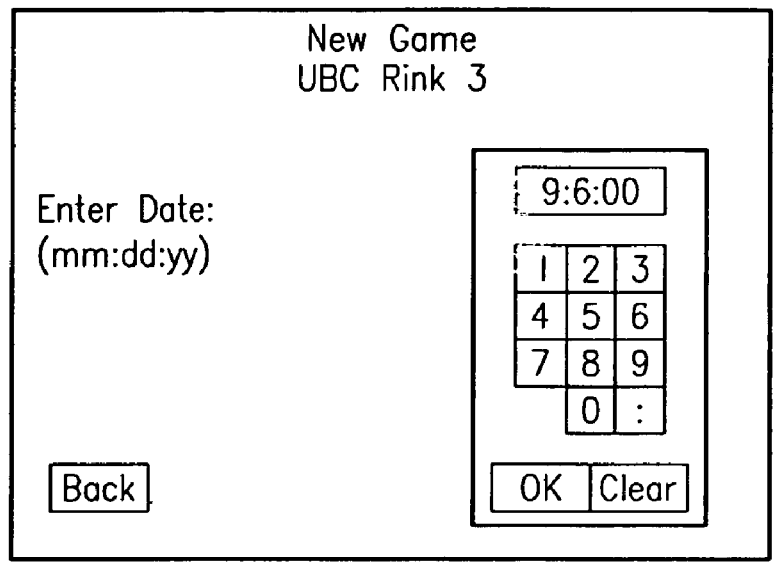
Figure 9:
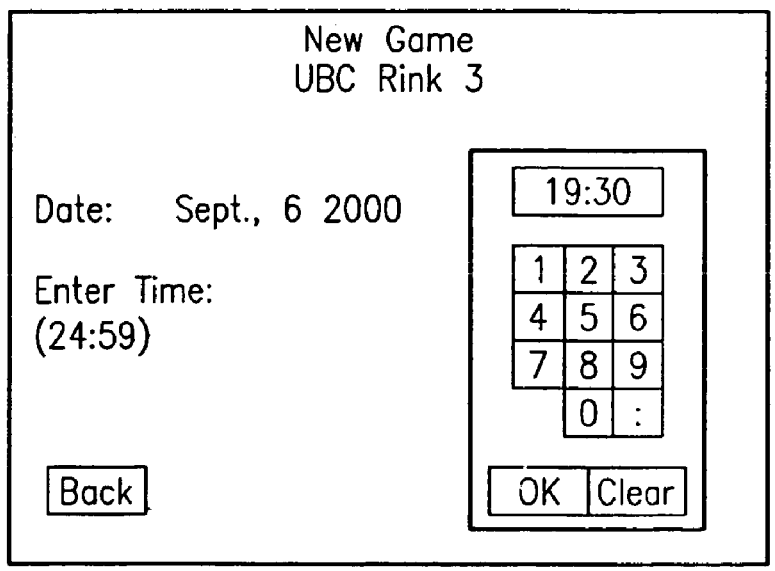
Figure 10:
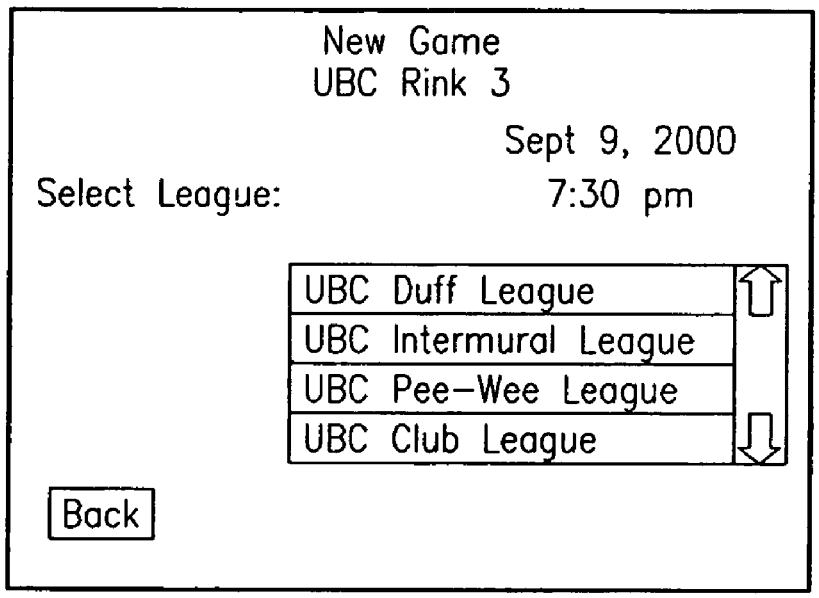
Figure 11:
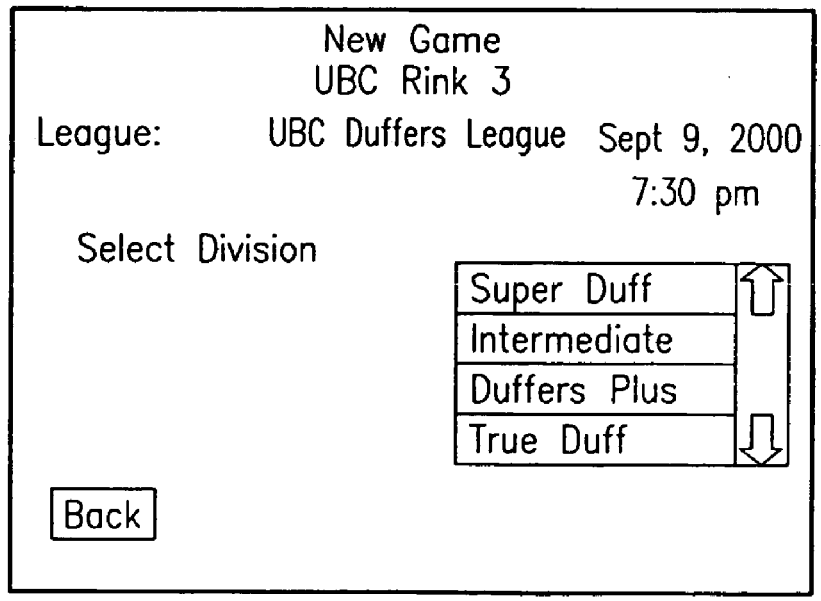
Figure 12:
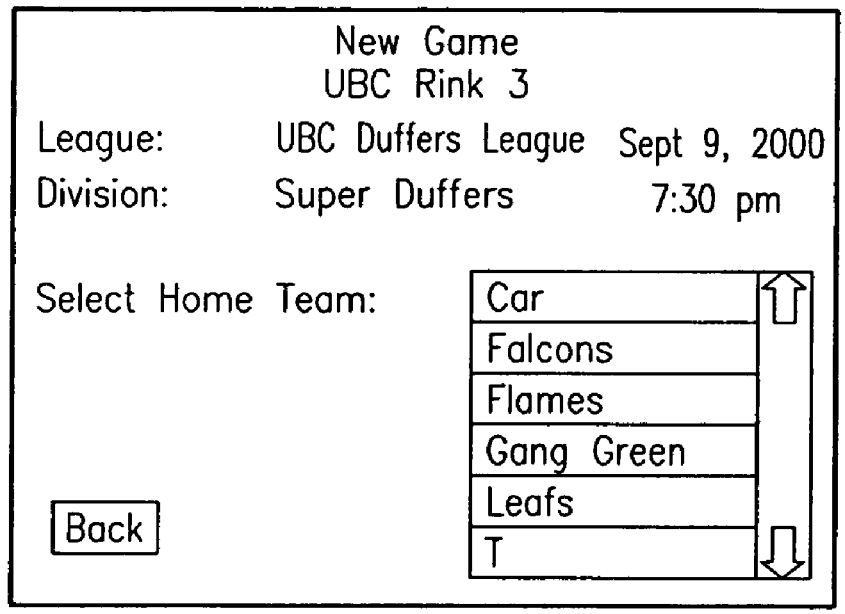
Figure 13:
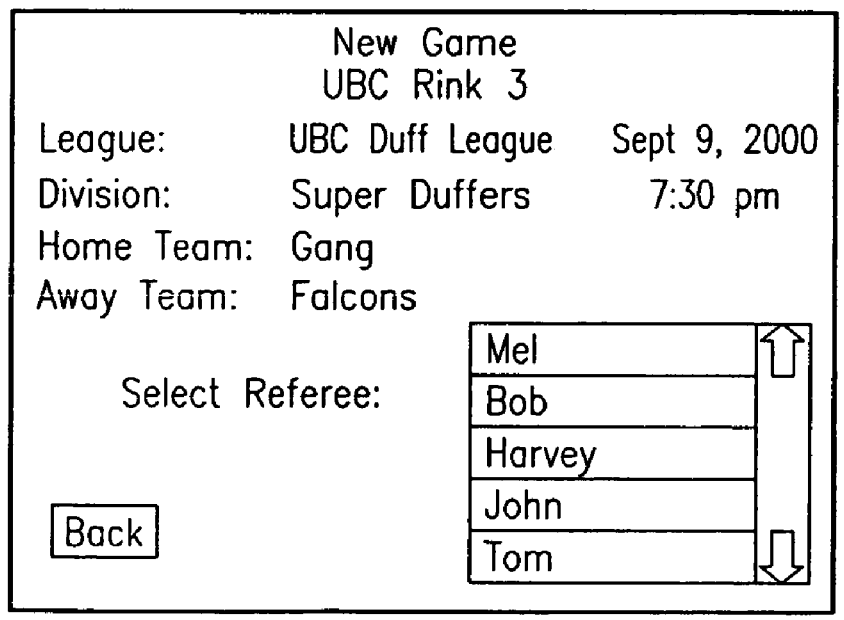
Figure 14:
Figure 15:

To begin a entering game data 100 for a new game, the scorekeeper 34 touches the touch screen display 44 and enters in a valid user ID (identification number) and a valid password as seen in FIGS. 4 and 5, and if successful, an electronic link is established between the server computer 114 and the touch screen computer terminal 32. The server computer 114 also downloads game data 100 to the touch screen computer terminal 32 once it is in communication therewith. Once this is accomplished, the scorekeeper 34 selects start a new game (FIG. 6), or selects restore saved game as shown in FIG. 7.

As the game progresses, touch screen terminal data 37 from every game is stored in a designated touch screen terminal file database (memory) 35 in the touch screen computer terminal 32, and only after the game is completed is the touch screen terminal file database 37 transmitted to the server computer 114 for organization and storage in the database 106. This feature allows the game to be played even in the event of communications failure between the touch screen computer terminal 32 and the server computer 114. Also, prior to selecting a new game (FIG. 6) and prior to entering data 100 for a new game, the touch screen computer program 33 executed on the touch screen computer terminal 32 computer process makes a determination as to whether any existing touch screen terminal file database 37 is stored at the touch screen computer terminal 32 and if so, the scorekeeper 34 can decide whether or not to restore a game or start a new game (seen in FIG. 7).

The process for a new game beings with the scorekeeper 34 systematically entering game data 100 into the touch screen computer terminal 32 at the ice rink 36. Initial pre-game steps walk the scorekeeper 34 through all the basic information about the game to be played, as seen in FIGS. 8–15. As seen in these figures, the scorekeeper enters the following touch screen terminal data 37 into the touch screen terminal 32: date, time, league, division, home and away teams, referee, linesman 1, linesman 2, and scorekeeper. Some of this game data 100 was downloaded from the server computer 114 when initial connection was made between the server computer and the touch screen computer terminal 32. The system may also be embodied so that the game may be selected from a schedule downloaded from the server computer 114. These initial steps make certain the scorekeeper 34 does not make errors with the game data 100 entered into the touch screen computer terminal 32 prior to a game commencing.

Figure 16:
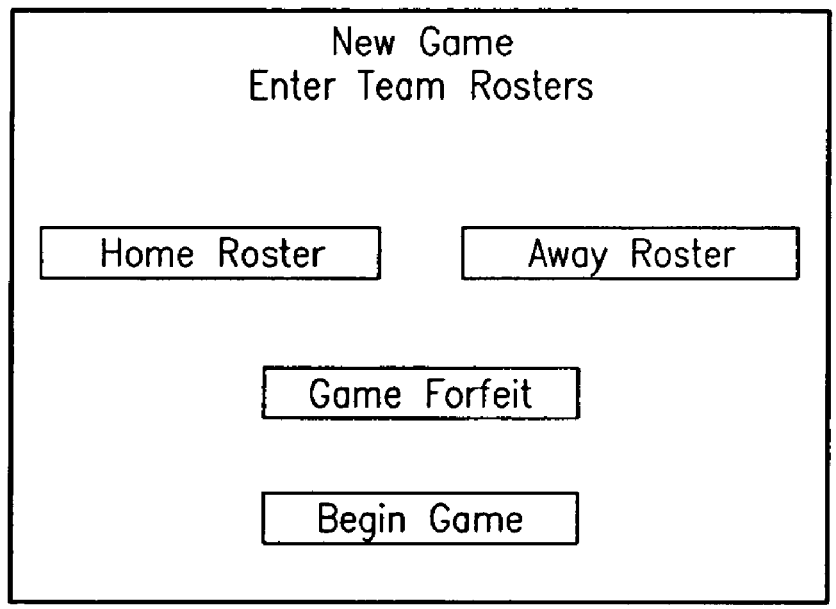
Figure 17:
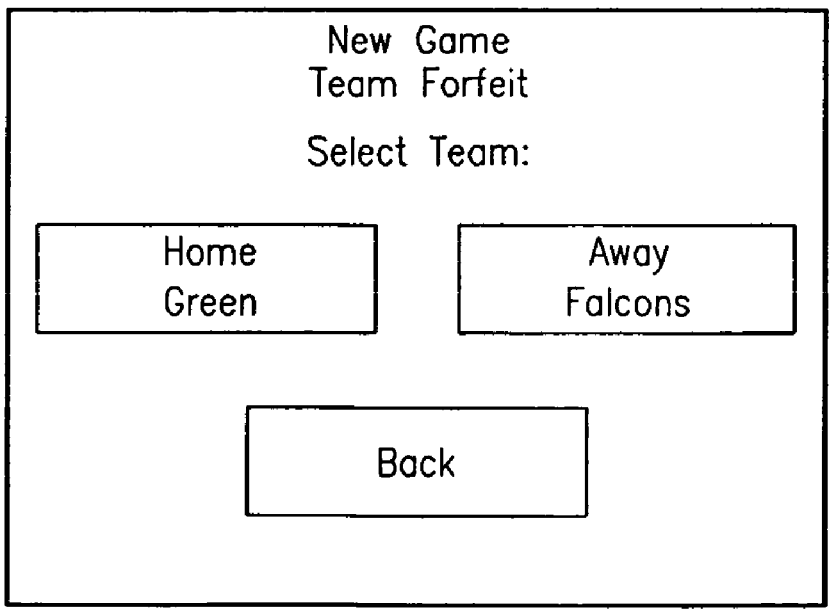
Figure 18:
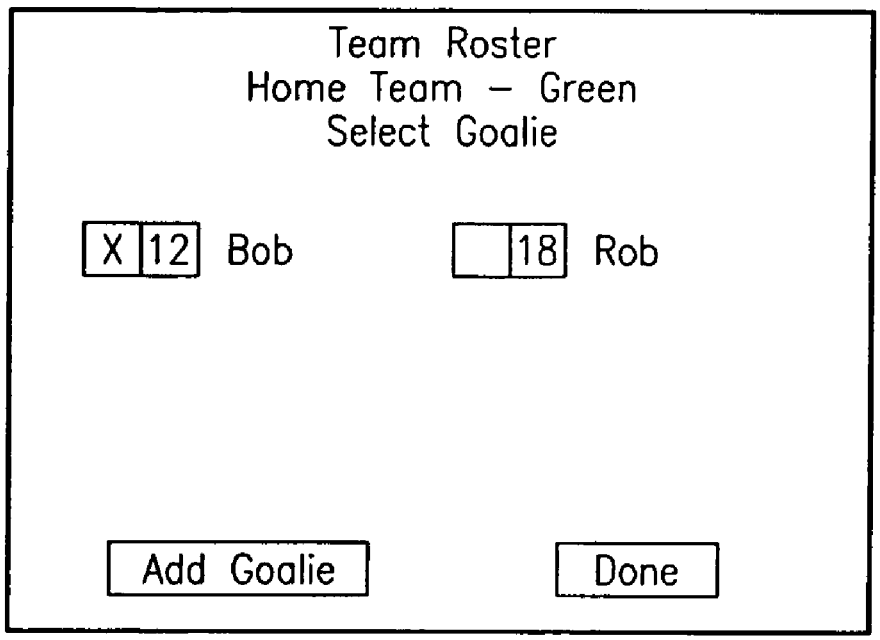
Figure 19:
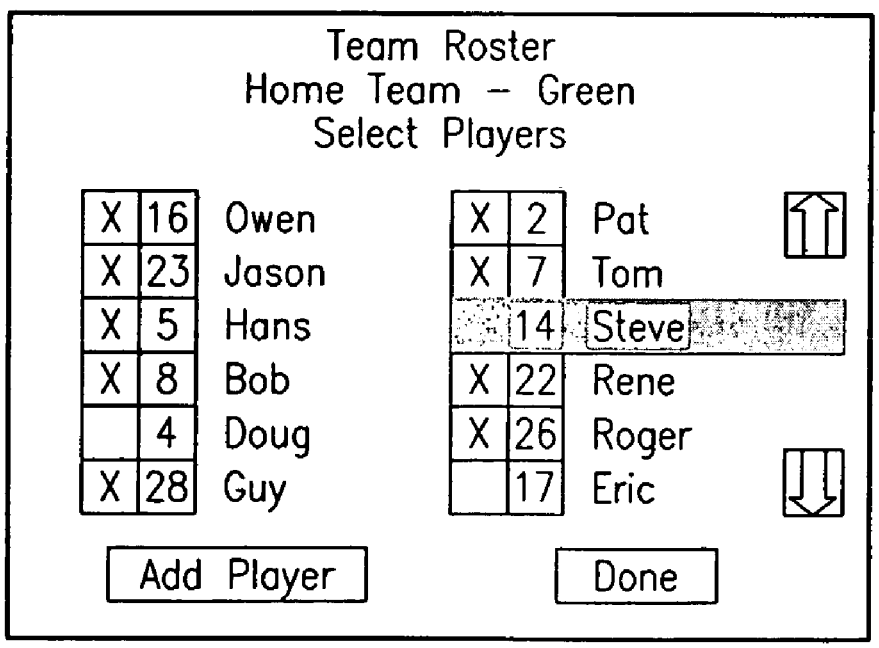
Figures 34, 35:
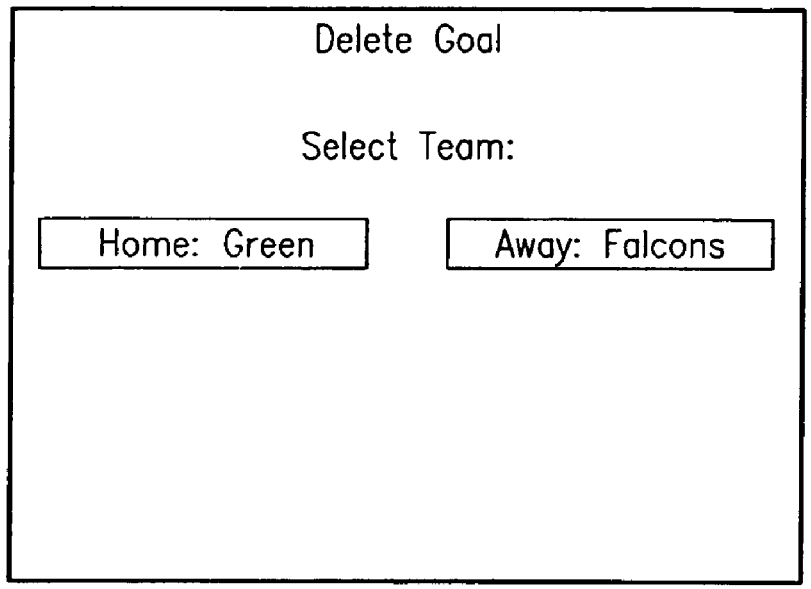
FIGS. 34–36 show the screen shots displayed on the touch screen for deleting goals.
Figure 36:
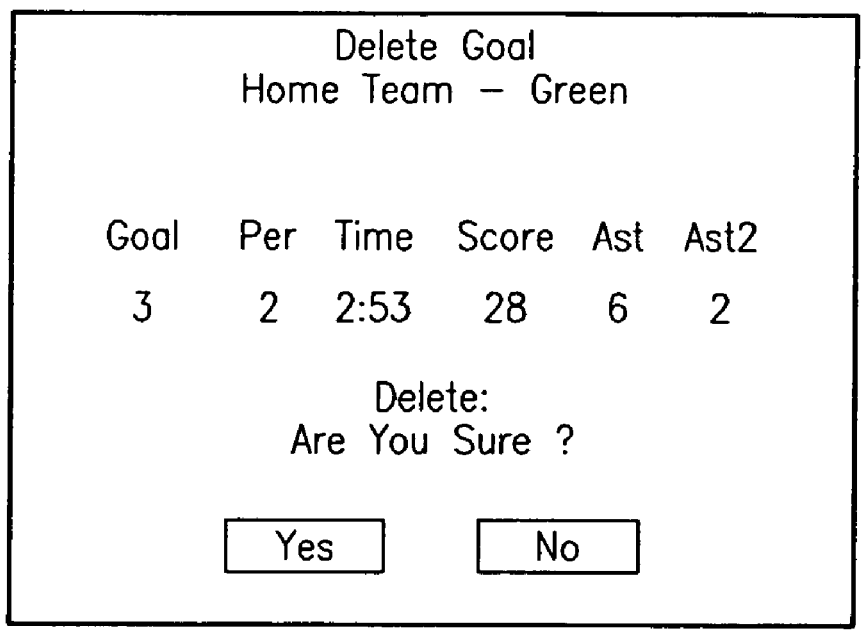
Figure 37:
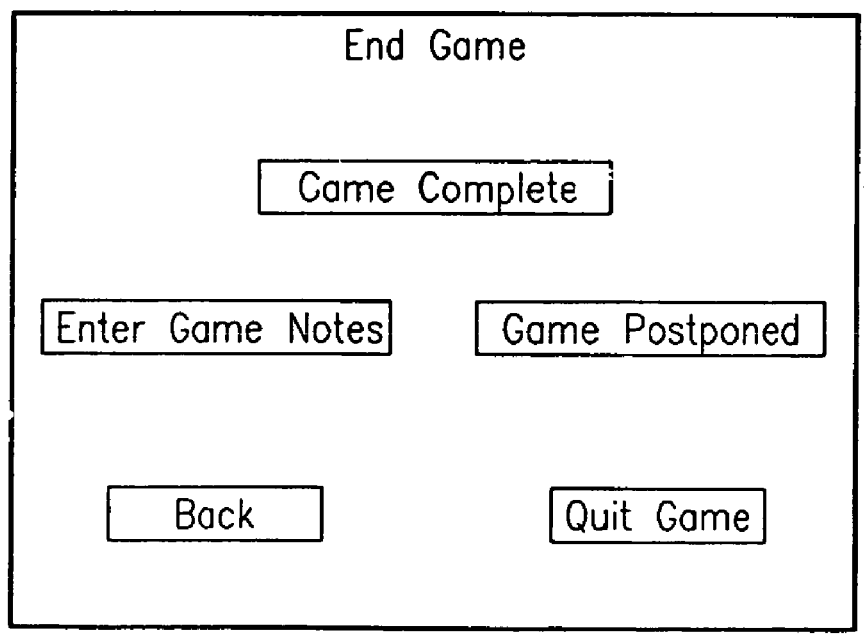
FIGS. 37–40 show the screen shots displayed on the touch screen after the game is completed, comprising the entry of game notes, and postponement of the game.
Figure 38:
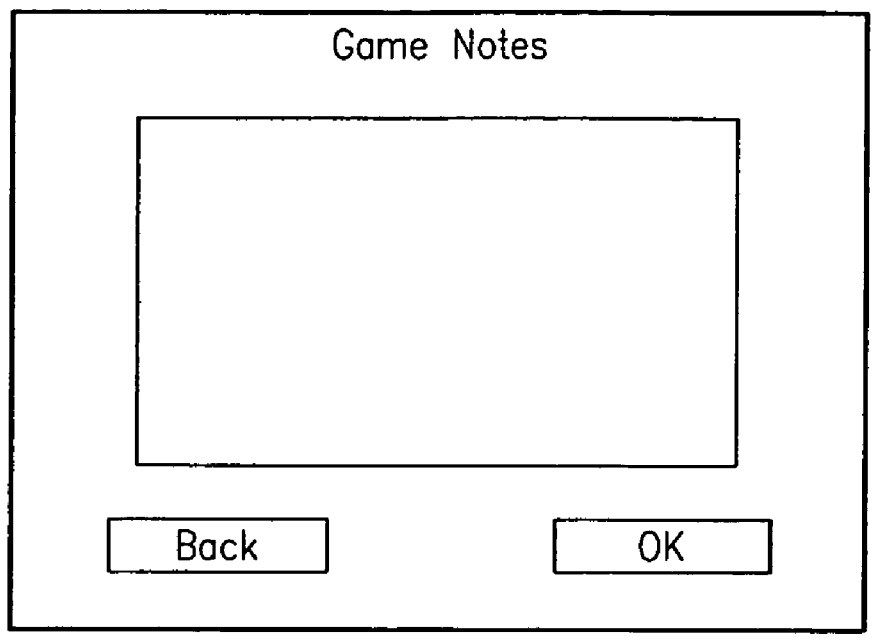

Next, turning to FIGS. 16–20, the computer server 114 in response to the touch screen terminal data 37 entered by the scorekeeper 34, downloads to the touch screen computer terminal 32 game data 100 pertaining to team rosters of the teams about to play so that the scorekeeper 34 has this game data. Thus, the scorekeeper 34 can quickly see on the touch screen display 44 the rosters for the teams that are about to play in the game. This game data 100 comprises default jersey numbers, suspensions, and available players. As seen in FIG. 16, the scorekeeper 34 inputs if there is a forfeit and what team forfeited, inputs the players playing (FIG. 19), inputs the goalies playing (FIG. 18), and can also see the suspended players (they are grayed out in FIG. 19) who are ineligible to play, and can change jersey numbers as necessary (FIG. 20).

Turning now to FIGS. 21–26, shown therein are the screen displays generated and displayed when the home and away goal buttons (52,54 respectively) from FIG. 3 are pressed by the scorekeeper 34 in the event a goal is scored. As seen in those figures, the name of the scorer by jersey number is entered into the touch screen computer terminal 32, along with the number of any player who assisted and secondarily assisted, along with the time and period the goal was scored.

Turning now to FIGS. 27–32, shown therein are the screen displays generated and displayed when the home and away penalty buttons 55, 58 from FIG. 3 are pressed by the scorekeeper 34 in the event a player incurs a penalty. The scorekeeper 34 need only enter into the touch screen computer terminal 32 player, the infraction, the severity (major or minor), the time of the infraction.

The buttons edit home roster 60 and edit away roster 62 allow the scorekeeper 34 to modify the roster during the game.

Returning to FIG. 3, shown therein is the other functions button 68 that allows the scorekeeper 34 to press thereon, and the touch pad screen displays 44 shown in FIGS. 33–36 are caused to appear on the touch screen terminal 32. As seen in FIG. 33, goals may be deleted, added, edited, and penalties may be edited.

Figure 39:
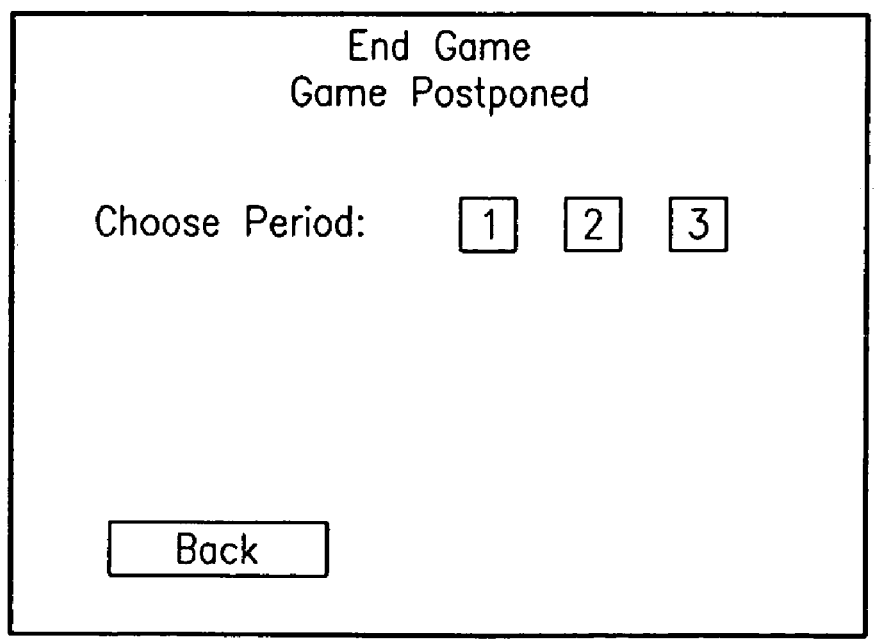
Figures 40, 41:
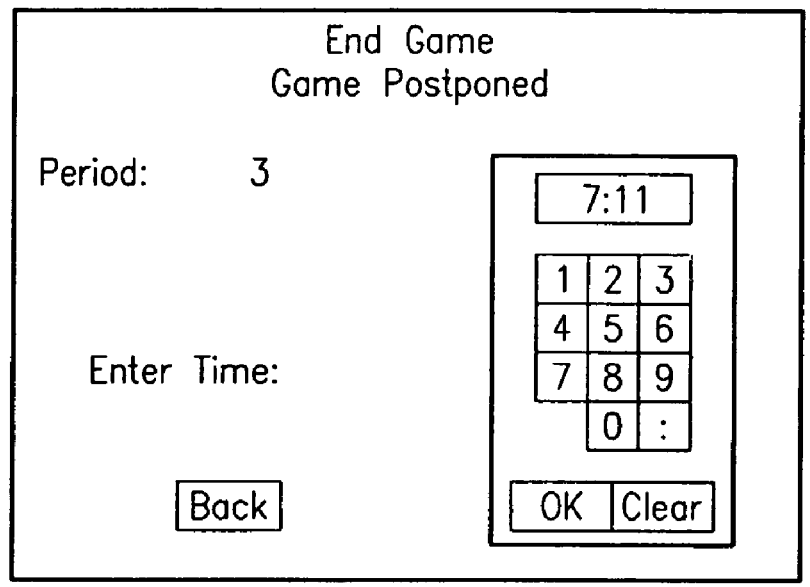
FIG. 41 shows the electronic game sheet screen shot displayed at the end of the game after all the game data has been entered.
Figure 42:
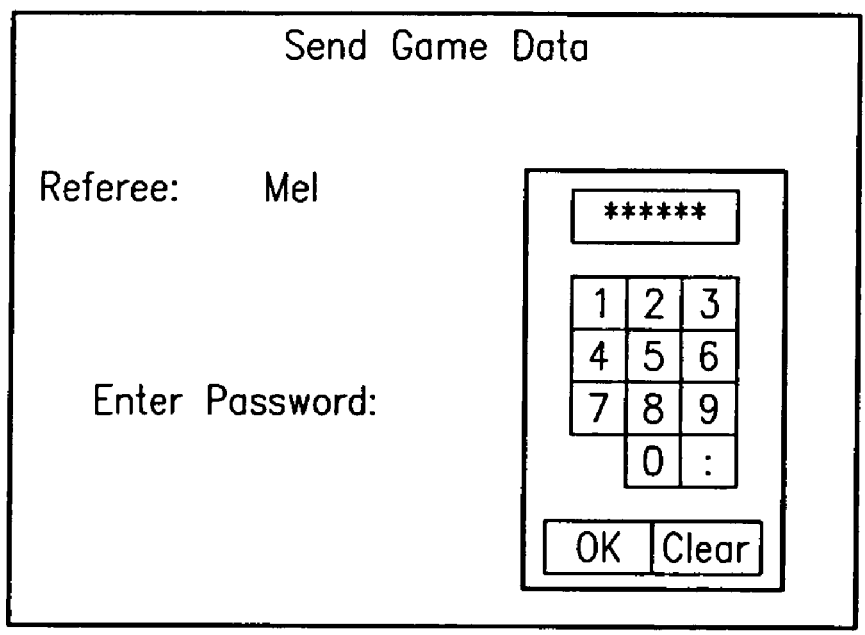
FIGS. 42–44 show the screen shots displayed on the touch screen for sending the game data to the server computer.
Figure 43:
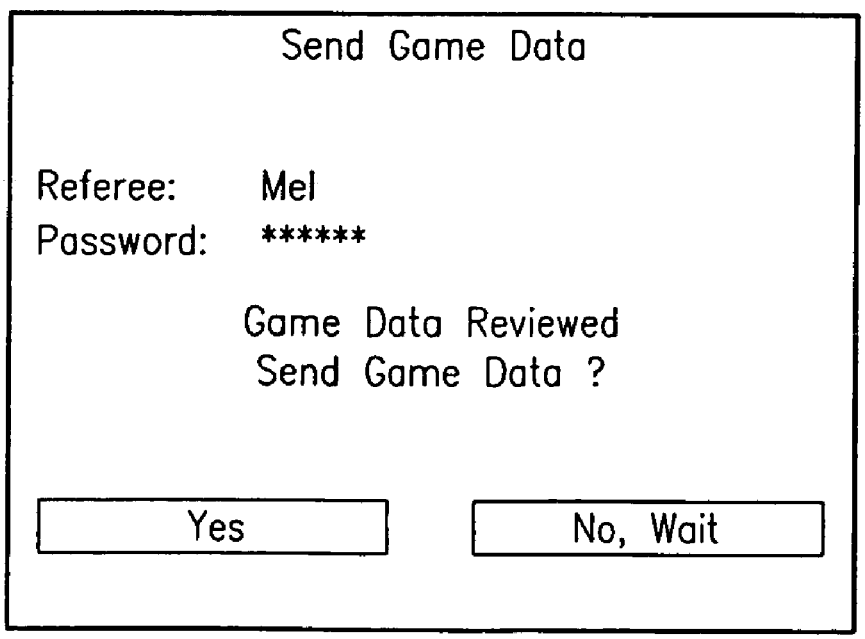
Figure 44:
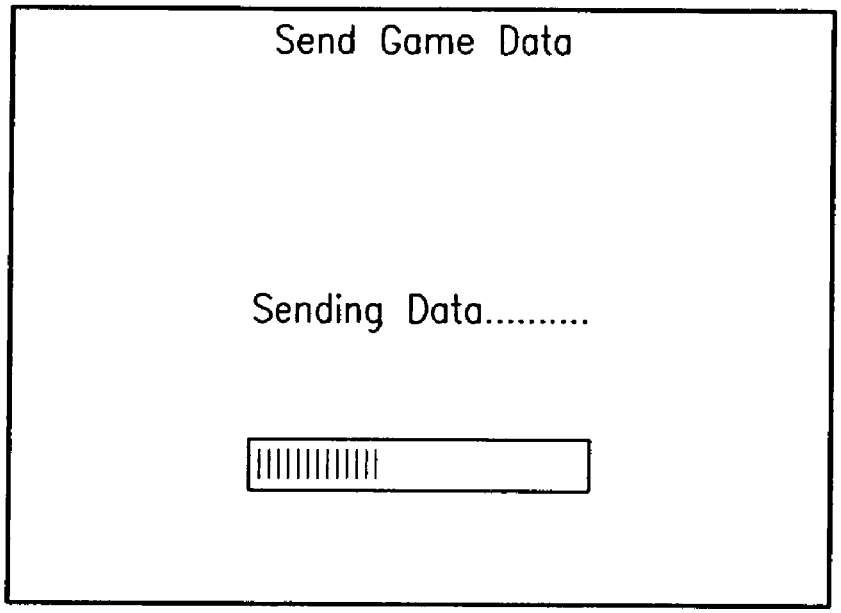
Figure 45:
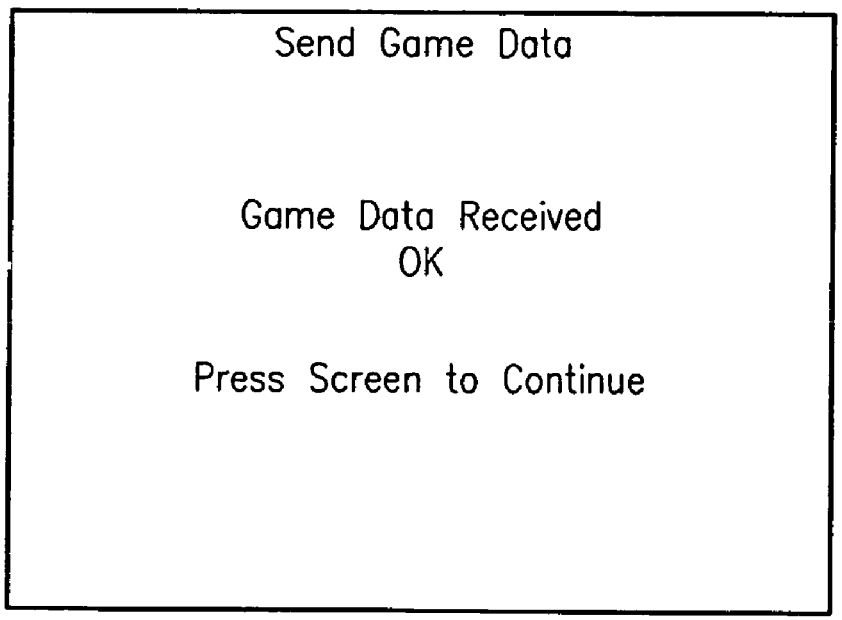
FIG. 45 shows the screen shot displayed on the touch screen confirming that the game data was received by the server computer.

Returning to FIG. 3, shown therein is the end game button 70, and when this button is pressed, the end game dialog is started, this dialog seen in FIGS. 37–45. The scorekeeper 34 enters notes (FIG. 38), and if the game was postponed when it was postponed (FIGS. 39–40). Before the final information pertaining to the game just played (or postponed if that is the case) is uploaded to the server 114, the head referee reviews and must approve of the game data 100 described above that has been entered into the electronic gamesheet 102, this shown in FIGS. 42–44.

Touch Screen Terminal Data Storage The touch screen computer terminal (or client computer) 32 is part of the present system 30, and the present system may be embodied to comprise a plurality of touch screen computer terminals 32 each located at an ice rink 36. In other embodiments, the touch screen computer terminal 32 may be a handheld wireless device. The touch screen computer terminal 32 is electronically linked to the server computer 114 as seen in FIG. 1. The game data 100 generated at each of the touch screen computer terminals 32 as the game is played and stored at each touch screen terminal file database 35 is uploaded to the server computer 114, and processed and stored in the database 106 before it becomes viewable at the Pointstreak.com web site.

The server computer (web server) 114 comprises vast quantities of game data 100 uploaded from all the games played, and therefor needs the database 106 as structured in FIG. 2. Also, to accommodate situations wherein there are power disruptions, and/or client computer 32—server computer 114 problems, each of the client computers 32 at the rink 36 stores the touch screen terminal data 37 in a non-volatile compact flash memory, such flash memory technologies known to those skilled in the art.

Due to the fact that there exists the possibility that multiple files of touch screen terminal data 37 may have to be stored on the touch screen computer terminal's 32 flash memory, files are stored in the following hierarchy: general information file, rink information file, league information file, team information files, game in progress data files, game in progress data files, completed game data files not posted, and completed game data files posted.

New Game Reference Files

When a new game is started, multiple files are used to provide information needed for proper initialization of game entry, these files comprising information on the Rink, League, Division, Officials, Teams, Rosters. The new game dialog dynamically downloads this from the server computer 114, and after downloading, these files are stored in the compact flash memory at their designated filename (based on rink ID—users and leagues that play on the rink; League ID—divisions teams, penalties and officials for the league; Team ID—players on teams, positions, jersey numbers, suspensions). The advantage here is that in the event of a communications failure with the server computer 114, previous/default versions of the files remain on the compact flash, so games can be played even if communication with the server computer 114 is down.

Game in Progress Data Storage

When a game is in progress, the software at the touch screen computer terminal 32 retains a database file comprising all the current game information called a current game data file, located in non-volatile memory. This data is updated every time the scorekeeper 34 enters new game data 100 into the touch screen computer terminal 32. In this manner, when the game is completed or ends, this current game data 100 file comprises the all the data to be uploaded to the server computer 114. This is accomplished by use of HTTP Posts.

Client Computer—Server Computer Communication

The data interaction between the touch screen computer terminal 32 (client computer) and the server computer 114 is by way of transmission control protocols (TCP) internet protocols (IP), such protocols being known to those skilled in the art. The interface involves use of internet based hyper text transmission protocols (HTTP) "GET" and "POST" requests, and these allow for quick transmission of text files over a TCP/IP link. Downloads from the server computer 114 to the touch screen terminal 32 is done by using HTTP "GET" requests to a hypertext preprocessor (PHP) script using variables in the uniform resource locator (URL) address. The server computer 114 responds with information in a text file.

Uploads to the server computer 114 are accomplished using the HTTP "POST" command to a PHP script which parses the data and returns a confirmation. These transactions may be accomplished using standard internet forms comprising fields for the data. Such forms known to those skilled in the art. The HTTP "POSTS" and "GETS" are provided by PHP scripts running on the server computer 114.

Start of a New Game

When a new game is started, as described, various files need to be downloaded from the server computer 114 to the touch screen computer terminal 32 for use as lookup tables for the teams, leagues, and divisions. Each of these files remains resident on the compact flash memory on the touch screen computer terminal 32 in case of internet failure, but each game should be started with downloading these files.

End of Game

After the game has been completed, game results are posted to the server computer 114 for processing thereby. This commences once the game is over, and from the touch screen computer terminal (client computer) 32 comes a HTTP "POST", the server computer 114 will attempt to parse the incoming data, and if the data is valid, there is a confirmation that has a unique Game ID for the posted game.

If the server 114 does not confirm the upload, the scorekeeper 34 re-attempts the upload again. If this fails, then the game must still be stored in on the touch screen terminal 32 flash memory. The next time a scorekeeper 34 attempts to upload data from the touch screen computer terminal 32, the system 30 checks if there are any outstanding game posts, and these should be attempted to be uploaded by the scorekeeper 34.

Once the scorekeeper 34 has selected the teams that are playing, the touch screen terminal 32 automatically downloads from the computer 100 the players that are going to play in the game. The system 30 automatically prevents those players who are suspended or who are unregistered from participating by preventing the scorekeeper 34 from being selected. These ineligible players are those who have been given the status by the league administrator 42 (see FIG. 1).

The billing for this service being provided to the teams, and the hockey rinks is made directly to the leagues and rinks. The server computer 114 may be embodied so as to comprise a merchant account, which timely bills for services rendered, and keeps track of debts owed.

The Web Site

After the game data is posted on the Pointstreak.com web site, the players may then view the game data 100 stored in the database 106 from their own personal computers. The game data 100 is available over the internet 116. The players may enter the web site and view game data 100 comprising their personal statistical data 101. A brief description of the game data 100, which comprises statistical data 101, available from the web site will be described presently.

The actual players and teams may enter the web site and visually view a plurality of information and game data 100, but not edit the information and game data 100 (seen in FIG. 1 is the player terminal 118 and its internet 116 link to the server 114 and database 106). What follows is a description of the screen displays caused to be generated by the server computer 114 executing the computer software program of the present invention.

Figure 46:
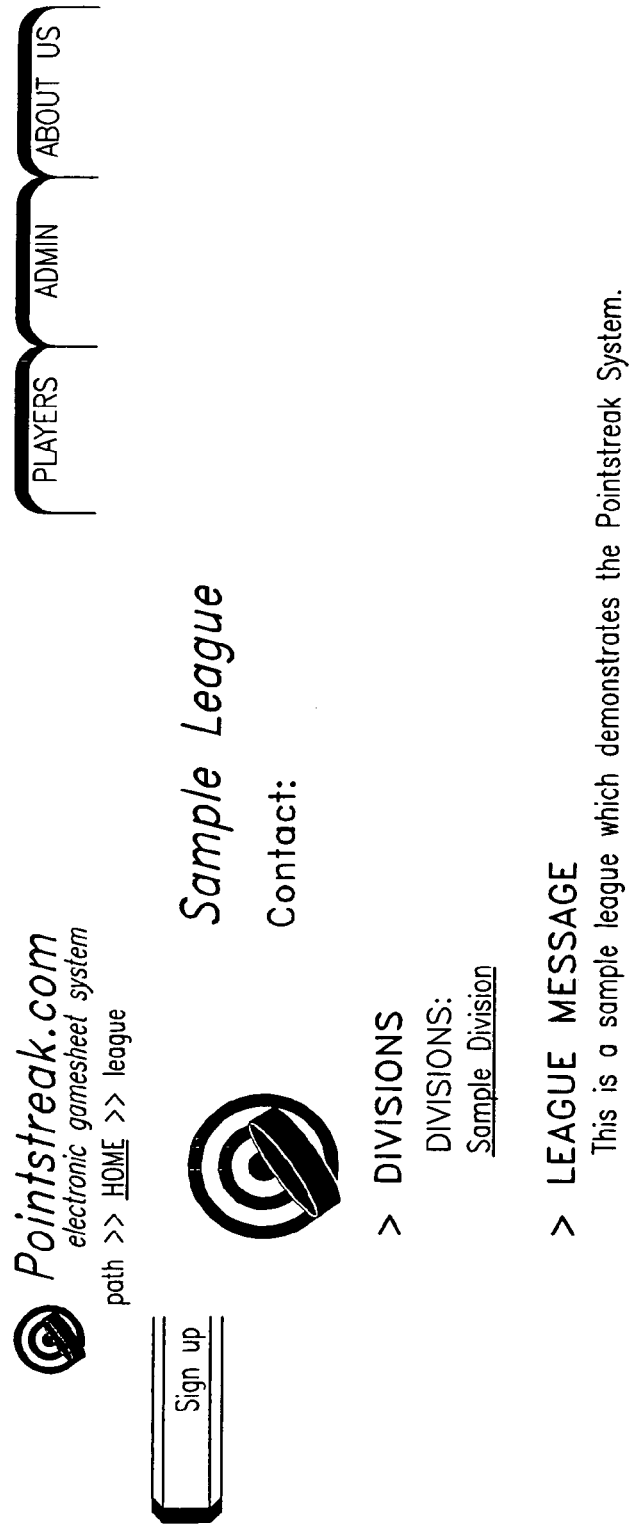

Turning now to FIG. 46, shown therein is a sample league and sample division. The player selects the Division and is brought to the web page for the division. The player may immediately select "View division scoring leaders" (FIGS. 55A and 55B) or "View division goaltending leaders" (FIG. 56) and be immediately brought to those web pages and view the statistical data 100 for each of these categories.

The abbreviations used throughout the web pages to identify statistical data are as follows:
GP—games played
W—games won
L—games lost
T—games tied
PTS—points
GF—goals for
GA—goals against
PIM—penalties in minutes
GAA—goals against average
GFA—goals for average
Home—record at home
Away—record not at home
SO—shutout The player can see the team standings and where his or her team stands in particular, as seen in FIG. 47. The player may also click on any team in the team standings list and be brought to the statistical data page for that team as seen in FIG. 51. At this web page, the player can view the selected team's record, recent games, upcoming games, and the team's captain's message. The player may also click on player schedule and be brought to a web page showing the schedule for the selected team. If player stats is selected, this web page displays the statistics for each member on the team (FIGS. 52A, 52B, and 54). The statistics sheet of FIGS. 52A, 52B and 53 shows each players GP, G, A, PTS, PIM, and the goalie statistics sheet (FIG. 54) shows the goalie's GP, L, T, GA, GAA, SO. The advantage of this feature is that each player can instantly access his or her personal statistical data 101 and compare them to other players on the team, or other players in the league. Also, upon clicking on the players name, a web page showing additional information about the player comprising age, size, date of birth, place of birth and a photo of the player is displayed (not shown in the figures).

Figure 48:
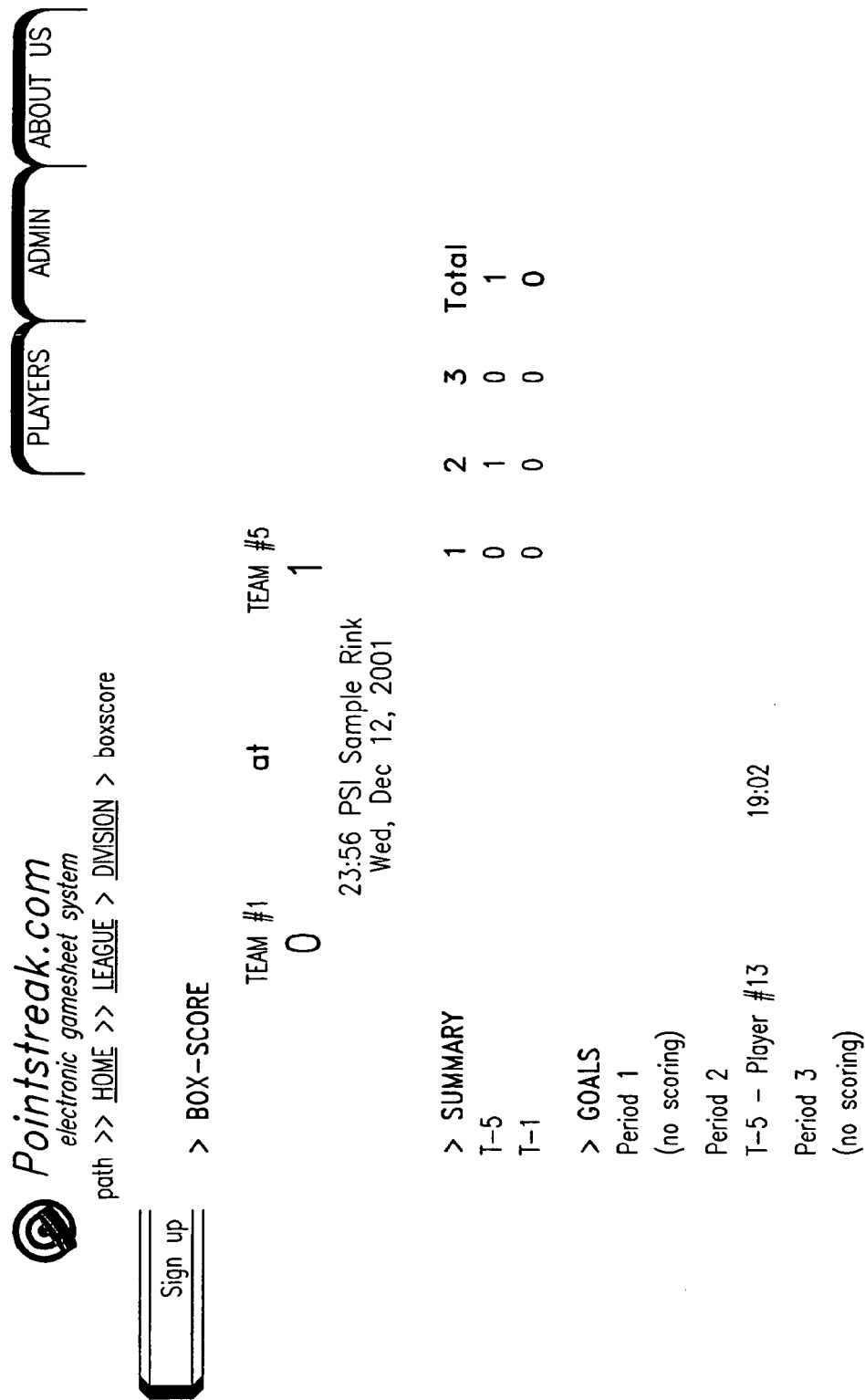

Another feature is the game box score web page, shown in FIGS. 48–50. This is a particularly useful web page that allows a player to see the important results from a game in one place. This web page displays the score, summary of scoring for each period, who and when goals were scored, penalties, the roster and goalies, the referee and scorekeeper, and gamenotes.

For any of the above statistical data 101 requiring mathematical calculations, the touch screen computer terminal's 32 processor may be embodied to comprise an arithmetic logic circuitry to perform such calculations. Thus when the scorekeeper enters the game data 100 therein, such calculations are automatically performed by the touch screen computer terminal 32 so that they are ready for uploading to the server 114.

Thus, the problems associated with paper based systems used to administrate hockey players, teams, and leagues, such as lost records, illegible records, old records, etc., has been successfully overcome with the present invention. Further, all players on a team now have instant and easy access to their personal statistics, as well at the competition statistics, making for more planned and enjoyable sporting competition. Also, administrators can do a more thorough and job because of the efficiency of the present invention.

Although several embodiments of the present invention have been described herein, various modification may be made without departing from the scope of the invention. All of these alternative embodiments are intended to come within the scope and spirit of the appended claims.

The invention claimed is:

1. A method for gathering game data for a game comprising the steps of:
   providing a server computer;
   providing the server computer with a database for storing and organizing the game data therein;
   providing a touch screen computer terminal at a sporting venue, the touch screen computer having a memory and in electronic communication with the server computer over a computer network;
   displaying a plurality of touch screen displays on the touch screen computer terminal, entering the game data into the plurality of touch screen displays as the game is being played and storing the entered game data in the touch screen computer terminal;
   verifying the stored game data by a referee;
   uploading the game data from the touch screen computer terminal to the server computer and storing the uploaded game data in the data base, the uploading by way of electronic communication between the touch screen computer terminal and the server computer; and
   providing the uploaded game data to an administrator computer so that an administrator can access the game data and make decisions pertaining to the game including decisions on suspending players, resolving disputes, and editing rosters and wherein the administrator provides these decisions to the referee over the computer network so a suspended player is not allowed to play.

2. The method of claim 1 further comprising the step of entering the game data by a scorekeeper into the plurality of touch screen displays that appear on the touch screen computer terminal in real time as the game data is generated as the game is played.

3. The method of claim 2 further comprising the step of having the scorekeeper download lookup tables from the server computer before a game is played.

4. The method of claim 1 wherein the plurality of touch screen displays comprise a touch screen display for the entry of statistical data pertaining to a player participating in the game.

5. The method of claim 1 wherein the plurality of touch screen displays are for entering the following game data comprising:
   organization data, team data, rink data, league data, division data, player data, officials
   data, referee data, game to be played data, roster data, goal scored data, penalty data, and statistical data.

6. The method according to claim 5 further comprising the step of editing the game data by the administrator on the administrator computer and further comprising the step of the administrator determining match-ups between teams for safety so that teams are evenly matched.

7. The method of claim 1 comprising the further step of using the game data stored in the touch screen terminal memory so that in the event of power failure and the electronic communication between the server computer and the touch screen computer terminal is disrupted, the game data is not lost and remains stored in the touch screen computer terminal's memory.

8. The method of claim 1 comprising the further steps of having a scorekeeper download portions of a game about to be played including player and team data from the server computer to the touch screen computer so the scorekeeper saves time by not having to input this data.

9. The method of claim 1 comprising the further step of making the game data available to the players over the internet so that the players can view the game data from their own personal computers and wherein the players are not allowed to edit the game data.

10. The method according to claim 1 wherein the computer server and the touch screen computer terminal are in communication with one another by way of wireless transmissions.

11. A method for gathering game data for a game comprising the steps of:
   providing a server computer and providing the server computer with a database for storing and organizing the game data therein;
   providing a touch screen computer terminal at a sporting arena, the touch screen computer in communication with the server computer;
   displaying a plurality of touch screen displays on the touch screen computer terminal, entering the game data into the plurality of touch screen displays as the game is being played and storing the entered game data in the touch screen computer terminal;
   uploading the game data from the touch screen computer terminal to the server computer and storing the uploaded game data in the data base, the uploading by way of providing electronic communication between the touch screen computer terminal and the server computer;
   providing the uploaded game data to an administrator of the game, the game data presented in the form of an electronic game sheet, so that the administrator can make decisions pertaining to the game including suspending players, editing rosters of teams, and determining team match-ups so that teams playing are evenly matched;

providing access to the game data over the internet; and providing the server with a merchant account and charging a fee to a sports league utilizing the electronic game sheet.

12. The method of claim 11 wherein a scorekeeper enters the game data into the plurality of touch screen displays that appear on the touch screen computer terminal in real time as the game data is generated as the game is played, and wherein the game data generated is verified by a referee before it is uploaded to the server computer so that accurate game data is stored in the database.

13. The method of claim 12 wherein the plurality of touch screen displays are for entering the following game data, the game data itself comprising:

organization data, team data, rink data, league data, division data, player data, officials data, referee data, game to be played data, roster data, goal scored data, penalty data, and statistical data.

* * * * *